US012766469B2

(12) United States Patent
Nakashima et al.

(10) Patent No.: US 12,766,469 B2
(45) Date of Patent: Oct. 20, 2026

(54) POROUS COMPOSITE

(71) Applicant: NGK INSULATORS, LTD., Nagoya-City (JP)

(72) Inventors: Takuya Nakashima, Nagoya-City (JP); Akihiro Miura, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 373 days.

(21) Appl. No.: 18/542,980

(22) Filed: Dec. 18, 2023

(65) Prior Publication Data

US 2024/0116008 A1 Apr. 11, 2024

Related U.S. Application Data

(63) Continuation of application No. PCT/JP2022/020938, filed on May 20, 2022.

(30) Foreign Application Priority Data

Aug. 3, 2021 (JP) ................................ 2021-127462

(51) Int. Cl.

*B01D 71/02* (2006.01)
*B01D 53/86* (2006.01)
*B01D 69/10* (2006.01)

(52) U.S. Cl.

CPC ....... *B01D 71/0223* (2022.08); *B01D 53/864* (2013.01); *B01D 69/108* (2022.08);
(Continued)

(58) Field of Classification Search

CPC .............. B01D 71/0223; B01D 53/864; B01D 69/108; B01D 71/0213; B01D 71/024;
(Continued)

(56) References Cited

U.S. PATENT DOCUMENTS

2008/0264010 A1* 10/2008 Mizuno .............. B01D 46/2478 55/350.1
2011/0185711 A1* 8/2011 Mey ..................... B01J 37/0242 428/116

(Continued)

FOREIGN PATENT DOCUMENTS

CN 107961813 A * 4/2018 ......... B01D 53/9418
CN 112236404 A 1/2021

(Continued)

OTHER PUBLICATIONS

Escapenet translation of JP 2006-239544A, Sep. 14, 2006. (Year: 2006).*

(Continued)

*Primary Examiner* — Joseph W Drodge

(74) *Attorney, Agent, or Firm* — Muncy, Geissler, Olds & Lowe, P.C.

(57) ABSTRACT

A porous composite includes a porous base material and a porous collection layer provided on a collection surface of the base material. The collection layer includes particles deposited in pores of the collection surface. In a plan view of the collection surface, the proportion of the area of a covered region that is covered with the collection layer out of the collection surface is less than or equal to 70%, and the proportion of the area of a pore region out of a non-covered region that is not covered with the collection layer is less than or equal to 15%.

9 Claims, 3 Drawing Sheets

(52) U.S. Cl.
CPC ....... *B01D 71/0213* (2022.08); *B01D 71/024* (2013.01); *B01D 2325/10* (2013.01)

(58) Field of Classification Search
CPC ........ B01D 2325/10; B01D 2255/2063; B01D 2255/2065; B01D 2255/2066; B01D 2255/20738; B01D 2255/20746; B01D 2255/40; B01D 2255/9202; B01D 2255/9205; B01D 2255/9207; B01D 2258/012; B01D 39/14; B01D 39/20; B01D 46/00; B01D 53/944; B01D 63/066; B01D 46/2418; B01D 46/2425; B01D 46/244; B01D 46/2451; B01D 46/2455; B01D 46/2459; B01D 46/2498; B01D 2258/01; B01D 2258/12; B01J 23/10; B01J 23/34; C04B 38/00; F01N 3/022; F01N 3/035; F01N 3/10; F01N 3/28
See application file for complete search history.

(56) References Cited

U.S. PATENT DOCUMENTS

| | | | | |
|---|---|---|---|---|
| 2011/0212831 | A1 | 9/2011 | Goto et al. | |
| 2012/0240538 | A1 | 9/2012 | Isoda et al. | |
| 2016/0115835 | A1 * | 4/2016 | Daido | B01D 46/2418 422/180 |
| 2016/0214086 | A1 * | 7/2016 | Ano | B01D 46/2492 |
| 2017/0296969 | A1 | 10/2017 | Ohashi et al. | |
| 2018/0280860 | A1 * | 10/2018 | Yasui | B01D 46/2492 |
| 2019/0301325 | A1 * | 10/2019 | Yoshioka | F01N 3/0222 |
| 2019/0390584 | A1 * | 12/2019 | Kasuga | F01N 3/0222 |
| 2021/0053005 | A1 | 2/2021 | Takeno et al. | |
| 2021/0094018 | A1 | 4/2021 | Nakashima et al. | |
| 2021/0299640 | A1 | 9/2021 | Izumi et al. | |
| 2021/0379523 | A1 | 12/2021 | Nakashima et al. | |
| 2022/0297092 | A1 | 9/2022 | Kuboyama et al. | |
| 2023/0001401 | A1 * | 1/2023 | Beall | B01D 53/885 |

FOREIGN PATENT DOCUMENTS

| | | | | | |
|---|---|---|---|---|---|
| DE | 102017009873 | A1 | * | 4/2018 | F01N 3/2828 |
| EP | 1985352 | B1 | * | 8/2012 | B01D 46/2429 |
| JP | 2006239544 | A | * | 9/2006 | |
| JP | 2007000697 | A | * | 1/2007 | |
| JP | 2009112962 | A | * | 5/2009 | B01D 46/24491 |
| JP | 2010-094628 | A | | 4/2010 | |
| JP | 2011-147931 | A | | 8/2011 | |
| JP | 2014-001679 | A | | 1/2014 | |
| JP | 5597153 | B2 | | 10/2014 | |
| JP | 5726414 | B2 | * | 6/2015 | B01J 35/56 |
| JP | 2020-001032 | A | | 1/2020 | |
| JP | 2021-053537 | A | | 4/2021 | |
| JP | 2021-155277 | A | | 10/2021 | |
| WO | 2016/056573 | A1 | | 4/2016 | |
| WO | WO-2019135182 | A1 | * | 7/2019 | B01J 29/85 |
| WO | WO-2019244272 | A1 | * | 12/2019 | C04B 41/85 |
| WO | 2020/194681 | A1 | | 10/2020 | |
| WO | 2021/157479 | A1 | | 8/2021 | |

OTHER PUBLICATIONS

Escapenet translation of JP 2007-697A, Jan. 11, 2007. (Year: 2007).*
Escapenet translation of JP 2009-112962A, May 28, 2009. (Year: 2009).*
Escapenet translation of DE 102017009873A1, Apr. 26, 2018. (Year: 2018).*
Escapenet translation of CN 10796183A, Apr. 27, 2018. (Year: 2018).*
Machine English translation of JP 5726414B2, Apr. 10, 2015. (Year: 2015).*
Chinese Office Action (with English translation) dated Jan. 12, 2026 (Application No. 202280047494.1).
English translation of the International Preliminary Report on Patentability (Chapter I) dated Feb. 15, 2024 (Application No. PCT/JP2022/020938).
International Search Report and Written Opinion (Application No. PCT/JP2022/020938) dated Aug. 9, 2022 (9 pages).

* cited by examiner

POROUS COMPOSITE

CROSS-REFERENCE TO RELATED APPLICATIONS

The present application is a continuation application of International Application No. PCT/JP2022/20938 filed on May 20, 2022, which claims priority to Japanese Patent Application No. 2021-127462 filed on Aug. 3, 2021. The contents of these applications are incorporated herein by reference in their entirety.

TECHNICAL FIELD

The present invention relates to a porous composite.

BACKGROUND ART

Vehicles or the like equipped with a diesel engine or a gasoline engine include a filter that collects particulate matter in an exhaust gas. As an example of such a filter, a honeycomb filter that includes a porous honeycomb base material may be used in which the base material includes a plurality of cells, some of which are provided with a mesh sealing part at their opening on the outflow side and the remaining ones of which are provided with a mesh sealing part at their opening on the inflow side.

For example, the honeycomb filter disclosed in Japanese Patent No. 5597153 (Document 1) includes a porous collection layer provided on surfaces of cells that are provided with a mesh sealing part at their opening on the outflow side. The collection layer is formed by a plurality of particles that are bonded to or intertwined with one another and that include flat plate particles. The surface of the collection layer has an open area ratio of higher than or equal to 10%. The honeycomb filter according to Document 1 can suppress an increase in initial pressure loss and a rise in pressure loss at the time of deposition of particulate matter.

In the honeycomb filter disclosed in International Publication No. 2020/194681 (Document 2), the collection layer provided on predetermined cells has an arithmetical mean height of greater than or equal to 0.1 μm and less than or equal to 12 μm, the arithmetical mean height representing surface roughness, and an average membrane thickness of greater than or equal to 10 μm and less than or equal to 40 μm. Accordingly, the honeycomb filter achieves a decrease in pressure loss and an improvement in the efficiency of collection of particulate matter.

The honeycomb filter disclosed in Japanese Patent Application Laid-Open No. 2020-1032 (Document 3) includes a collection layer whose surface layer includes a part configured of a sintered body of $CeO_2$ particles having a mean particle size of less than or equal to 1.1 μm. This allows lower-temperature combustion of collected particulate matter by oxidation. Japanese Patent Application Laid-Open No. 2021-53537 (Document 4) discloses a composite oxide catalyst that can lower the starting temperature of oxidation of particulate matter. The composite oxide catalyst contains, as its metal content, cerium as a first metal, lanthanum as a second metal, and a third metal. The third metal is a transition metal or a rare-earth metal other than cerium and lanthanum. The cerium content in the metal content is higher than or equal to 5 mol % and lower than or equal to 95 mol %, the lanthanum content is higher than or equal to 2 mol % and lower than or equal to 93 mol %, and the third metal content is higher than or equal to 2 mol % and lower than or equal to 93 mol %.

Although, as described above, the porous composite configuring the honeycomb filter according to Document 1 achieves a decrease in pressure loss, there is demand in recent years for not only a decrease in pressure loss but also an improvement in the efficiency of collection of particulate matter or the like. Achieving both low pressure loss and high collection efficiency is not easy because these two are usually in a trade-off relationship. The porous composite according to Document 2 achieves both of a decrease in pressure loss and an improvement in collection efficiency, but the improvement in collection efficiency may be insufficient.

SUMMARY OF THE INVENTION

The present invention is intended for a porous composite, and it is an object of the present invention to achieve low pressure loss and high collection efficiency.

A porous composite according to one preferable embodiment of the present invention includes a porous base material, and a porous collection layer provided on a collection surface of the base material. The collection layer includes particles deposited in pores of the collection surface. In a plan view of the collection surface, a proportion of an area of a covered region that is covered with the collection layer out of the collection surface is less than or equal to 70%, and a proportion of an area of a pore region out of a non-covered region that is not covered with the collection layer is less than or equal to 15%.

According to the present invention, it is possible to achieve low pressure loss and high collection efficiency.

Preferably, in a plan view of the collection surface, the proportion of the area of the covered region out of the collection surface is more than or equal to 25%.

Preferably, the particles have cavities therein.

Preferably, the particles have a bulk density of less than 0.50 g/ml.

Preferably, d10 of a cumulative particle size distribution of the particles is greater than or equal to 0.3 μm, and d90 thereof is less than or equal to 20 μm.

Preferably, the collection layer has a porosity of higher than or equal to 70% and lower than or equal to 90%.

Preferably, the particles include catalyst particles that accelerate oxidation of a collection.

Preferably, the catalyst particles are $CeO_2$, a lanthanum-cerium composite oxide, a lanthanum-manganese-cerium composite oxide, a lanthanum-cobalt-cerium composite oxide, a lanthanum-iron-cerium composite oxide, or a lanthanum-praseodymium-cerium composite oxide.

Preferably, the base material has a honeycomb structure whose interior is partitioned into a plurality of cells by a partition wall, and at least some of the plurality of cells have an inner surface that serves as the collection surface.

Preferably, the porous composite serves as a gasoline particulate filter that collects particulate matter in an exhaust gas exhausted from a gasoline engine.

These and other objects, features, aspects and advantages of the present invention will become more apparent from the following detailed description of the present invention when taken in conjunction with the accompanying drawings.

DETAILED DESCRIPTION

Figure 1:
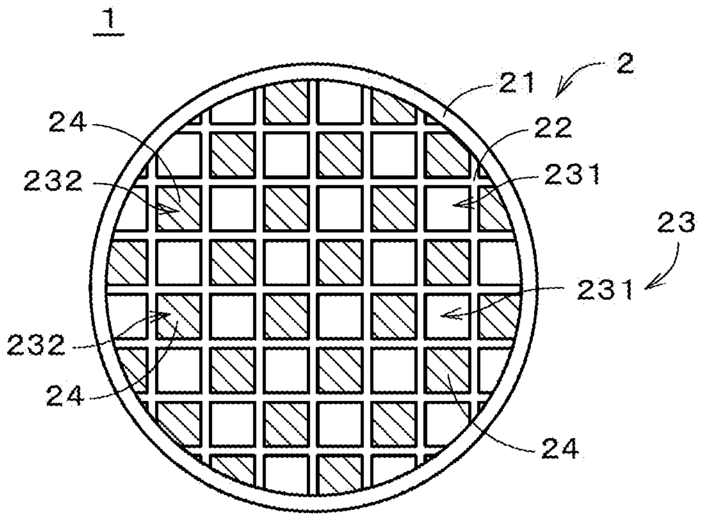
FIG. 1 is a plan view of a porous composite.
Figure 2:
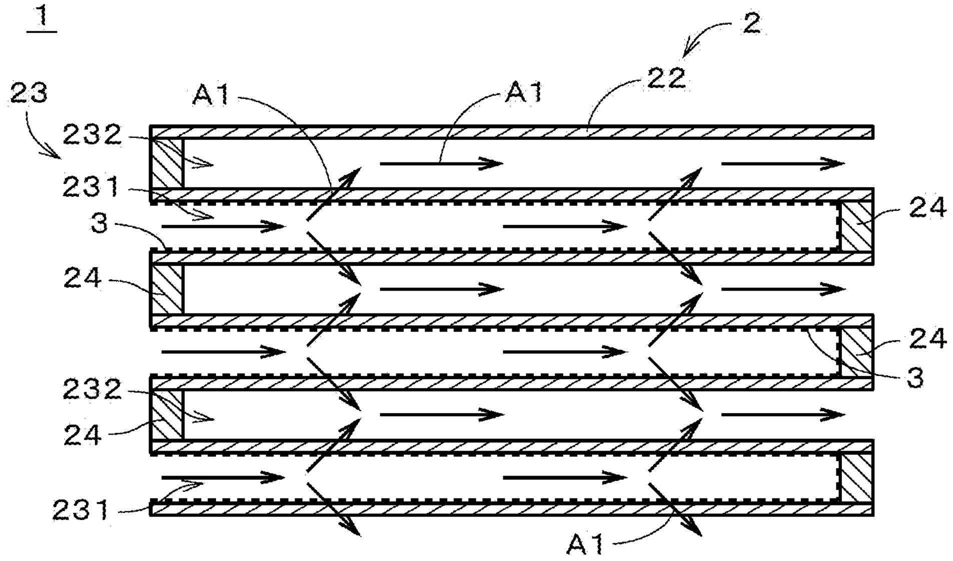
FIG. 2 is a sectional view of the porous composite.

FIG. 1 is a plan view showing a porous composite 1 according to one embodiment of the present invention in a simplified form. The porous composite 1 is a tubular member that is long in one direction, and FIG. 1 shows the end face on one side in the longitudinal direction of the porous composite 1. FIG. 2 is a sectional view of the porous composite 1. FIG. 2 shows part of a section along the longitudinal direction. For example, the porous composite 1 may be used as a gasoline particulate filter (GPF) that collects particulate matter such as soot in an exhaust gas exhausted from a gasoline engine of an automobile or the like.

The porous composite 1 includes a porous base material 2 and a porous collection layer 3 (see FIG. 2). In the example shown in FIGS. 1 and 2, the base material 2 is a member having a honeycomb structure. The base material 2 includes a tubular outer wall 21 and a partition wall 22. The tubular outer wall 21 is a cylindrical portion that extends in the longitudinal direction (i.e., the right-left direction in FIG. 2). The tubular outer wall 21 may have, for example, an approximately circular sectional shape perpendicular to the longitudinal direction. This sectional shape may be any other shape such as a polygonal shape.

The partition wall 22 is a gird portion that is provided in the interior of the tubular outer wall 21 and partitions the interior into a plurality of cells. As will be described later, these cells include a plurality of first cells 231 and a plurality of second cells 232. In the following description, when there is no need to distinguish between the first cells 231 and the second cells 232, the first cells 231 and the second cells 232 are simply referred to as "cells 23." Each of the cells 23 serves as a space that extends in the longitudinal direction. Each cell 23 may have, for example, an approximately square shape perpendicular to the longitudinal direction. This sectional shape may be any other shape such as a polygonal shape or a circular shape. The cells 23, as a general rule, have the same sectional shape. Alternatively, the cells 23 may include cells 23 that have different sectional shapes. The base material 2 is a cell structure whose interior is partitioned into the cells 23 by the partition wall 22.

The tubular outer wall 21 and the partition wall 22 are each porous. For example, the tubular outer wall 21 and the partition wall 22 may be formed of ceramics such as cordierite. The materials for the tubular outer wall 21 and the partition wall 22 may also be ceramics other than cordierite, or may be a different material other than ceramics.

The tubular outer wall 21 may have a longitudinal length of, for example, 50 mm to 300 mm. The outside diameter of the tubular outer wall 21 may be in the range of, for example, 50 mm to 300 mm. The thickness of the tubular outer wall 21 may, for example, be greater than or equal to 30 μm and preferably greater than or equal to 50 μm. The thickness of the tubular outer wall 21 may also be, for example, less than or equal to 1000 μm, preferably less than or equal to 500 μm, and more preferably less than or equal to 350 μm. The partition wall 22 has approximately the same longitudinal length as the tubular outer wall 21. The thickness of the partition wall 22 may, for example, be greater than or equal to 30 μm and preferably greater than or equal to 50 μm. The thickness of the partition wall 22 may also be, for example, less than or equal to 1000 μm, preferably less than or equal to 500 μm, and more preferably less than or equal to 350 μm.

The base material 2 including the tubular outer wall 21 and the partition wall 22 has a porosity of, for example, higher than or equal to 20% and preferably higher than or equal to 30%. The porosity of the base material 2 may also be, for example, lower than or equal to 80% and preferably lower than or equal to 70%. The open porosity of the base material 2 may, for example, be higher than or equal to 40% and preferably higher than or equal to 55%. The open porosity of the base material 2 may also be, for example, lower than or equal to 65%. The porosity and open porosity of the base material 2 can be measured by the Archimedes method.

The base material 2 may have a mean pore diameter (pore size) of, for example, greater than or equal to 5 μm and preferably greater than or equal to 8 μm. The mean pore diameter of the base material 2 may also be, for example, less than or equal to 30 μm and preferably less than or equal to 25 μm. This mean pore diameter can be measured by a mercury porosimeter. The open area ratio of the surface of the base material 2 may, for example, be higher than or equal to 20% and preferably higher than or equal to 25%. The open area ratio of the surface of the base material 2 may also be, for example, lower than or equal to 60% and preferably lower than or equal to 50%. This open area ratio of the surface represents the proportion of the area of a region where pores are open out of the surface of the base material 2 and may be obtained through image analysis of a scanning electron microscope (SEM) image of this surface. The SEM image may be obtained at, for example, 500× magnification. This image analysis may be conducted using, for example, image analysis software "Image-Pro ver.9.3.2" manufactured by Nippon Roper K. K.

The base material 2 may have a cell density (i.e., the number of cells 23 per unit area of a section perpendicular to the longitudinal direction) of, for example, higher than or equal to 10 cells/cm$^2$, preferably higher than or equal to 20 cells/cm$^2$, and more preferably higher than or equal to 30 cells/cm$^2$. The cell density may also be, for example, lower than or equal to 200 cells/cm$^2$ and preferably lower than or equal to 150 cells/cm$^2$. In FIG. 1, the cells 23 are illustrated larger than their actual size, and the number of cells 23 is illustrated smaller than the actual number. The magnitude and number of cells 23 may be modified in various ways.

When the porous composite 1 is used as a GPF, a gas such as an exhaust gas flows through the interior of the porous composite 1, with one end side (i.e., the left side in FIG. 2) of the porous composite 1 in the longitudinal direction serving as an inlet and the other end side thereof serving as an outlet. Among the cells 23 of the porous composite 1, some cells 23 are provided with a mesh sealing part 24 at their end on the inlet side, and the remaining cells 23 are provided with a mesh sealing part 24 at their end on the outlet side.

FIG. 1 illustrates the inlet side of the porous composite 1. To facilitate understanding of the drawing, hatching is added to the mesh sealing parts 24 on the inlet side in FIG. 1. In the example shown in FIG. 1, the cells 23 that have the mesh sealing part 24 on the inlet side and the cells 23 that do not have the mesh sealing parts 24 on the inlet side (i.e., the cells 23 that have the mesh sealing part 24 on the outlet side) are alternately aligned in both of the longitudinal and lateral directions in FIG. 1.

In the following description, the cells 23 that have the mesh sealing part 24 on the outlet side are also referred to as the "first cells 231," and the cells 23 that have the mesh sealing part 24 on the inlet side are also referred to as the "second cells 232." In the porous composite 1, the first cells 231 that are sealed at one end in the longitudinal direction and the second cells 232 that are sealed at the other end in the longitudinal direction are alternately arranged.

The collection layer 3 is formed on the base material 2. In the example shown in FIG. 2, the collection layer 3 is provided in the first cells 231 having the mesh sealing part 24 on the outlet side and covers the inner surfaces of the first cells 231 (i.e., the surface of the partition wall 22). The collection layer 3 does not cover the entire inner surfaces of the first cells 231 and covers part of the inner surfaces. In FIG. 2, the collection layer 3 is indicated by thick broken lines. In the first cells 231, the collection layer 3 may also be provided on the inner surfaces of the mesh sealing parts 24 on the outlet side. Meanwhile, the collection layer 3 is not provided on the second cells 232 having the mesh sealing part 24 on the inlet side. In other words, the inner surfaces of the second cells 232 are exposed without being covered with the collection layer 3.

In the porous composite 1 shown in FIGS. 1 and 2, as indicated by arrows A1 in FIG. 2, a gas flowing into the porous composite 1 flows from the inlets of the first cells 23 that are not sealed on the inlet side into the first cells 231 and flows from the first cells 231 through the porous collection layer 3 and the partition wall 22 to the second cells 232 that are not sealed on the outlet side. At this time, collections (here, particulate matter) in the gas are collected efficiently by the collection layer 3. When the collection layer 3 includes catalyst particles which will be described later, combustion of the collected particulate matter (i.e., removal by oxidation) is accelerated. In the following description, the inner surfaces of the first cells 231 provided with the collection layer 3 are also referred to as a "collection surface."

Figure 3:
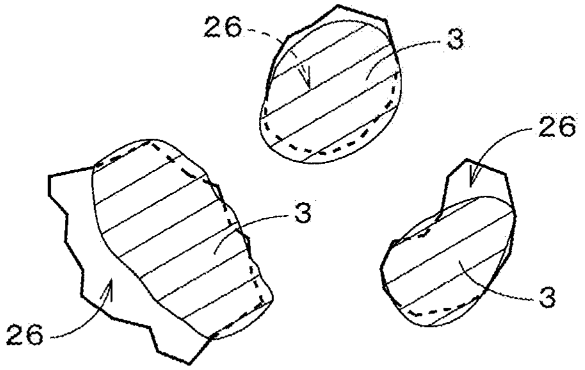
FIG. 3 is a diagram showing a collection surface.
Figure 4:
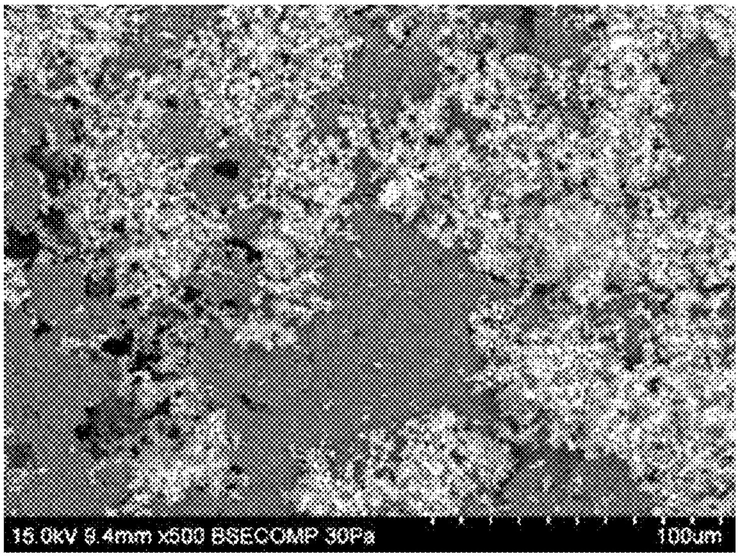
FIG. 4 shows an SEM image of the collection surface.

FIG. 3 is a diagram showing the collection surface provided with the collection layer 3, and FIG. 4 shows an SEM image showing one example of the collection surface. FIGS. 3 and 4 show the collection surface and the collection layer 3 as viewed in a direction approximately perpendicular to the collection surface (i.e., in plan view). In FIG. 3, regions enclosed by thick solid lines and broken lines correspond to regions 26 of pores that are open in the collection surface (hereinafter, referred to as "pore regions 26"), hatched regions correspond to the collection layer 3, and the remaining region corresponds to the surface of the base material 2. As will be described later, the collection layer 3 is formed by deposition of particles. In the SEM image shown in FIG. 4, white portions correspond to particles of the collection layer 3, black portions correspond to portions of the pore regions 26 that are not covered with the collection layer 3, and gray portions correspond to the surface of the base material 2. The collection layer 3 includes a plurality of isolated areas that are each indicated by the reference sign 3 in FIG. 3.

In a plan view of the collection surface as shown in FIGS. 3 and 4, when a region covered with the collection layer 3 is referred to as a "covered region," the proportion of the area of the covered region out of the correction surface is more than or equal to 70% in the porous composite 1. In other words, the value obtained by dividing the area of the covered region included in an arbitrary region of the correction surface in plan view by the area of the arbitrary region is less than or equal to 70%. In the following description, the proportion of the area of the covered region out of the collection surface is referred to as a "coverage ratio of the collection surface." The collection surface with an excessively high coverage ratio increases pressure loss. The coverage ratio of the collection surface is preferably lower than or equal to 65% and more preferably lower than or equal to 60%.

The coverage ratio of the collection surface may also be, for example, higher than or equal to 20%, preferably higher than or equal to 25%, and more preferably higher than or equal to 30%. The collection surface with an excessively low coverage ratio lowers the efficiency of collection of particulate matter serving as collections. As will be described later, in the porous composite 1, the collection layer 3 is selectively or preferentially formed on the pore regions 26 of the collection surface. Thus, when the coverage ratio of the collection surface is, for example, ¾ times or more of the open area ratio of the surface of the base material 2, the collection layer 3 is present on most part of the pore regions 26. When the coverage ratio of the collection surface is higher than or equal to the open area ratio of the surface of the base material 2, the collection layer 3 is present in a larger proportion on the pore regions 26.

When a region of the collection surface that is not covered with the collection layer 3 is referred to as a "non-covered region," the proportion of the area of the pore regions 26 out of the non-covered region is less than or equal to 15%. In other words, the value obtained by dividing the area of the pore regions included in the non-covered region out of an arbitrary region of the collection surface in plan view by the area of the non-covered region is less than or equal to 15%. In the following description, the proportion of the area of the pore regions 26 out of the non-covered region is referred to as a "pore ratio of the non-covered region." The non-covered region with an excessively high pore ratio lowers the efficiency of collection of particulate matter because the amount of gas that does not permeate through the collection layer 3 increases. The pore ratio of the non-covered region may preferably be lower than or equal to 13% and more preferably lower than or equal to 10%. The pore ratio of the non-covered region is also higher than or equal to 0%.

In the typical porous composite 1, the pore ratio of the non-covered region is lower enough than the open area ratio of the surface of the base material 2. For example, the pore ratio of the non-covered region may be lower than or equal to a half of the open area ratio of the surface and preferably lower than or equal to ⅔ of the open area ratio of the surface. In this porous composite 1, it can be said that the collection layer 3 is present on most of the pore regions 26. This improves the efficiency of collection of particulate matter. Preferably, the collection layer 3 is present on 70% or more of the pore regions 26. Meanwhile, the collection layer 3 is less likely to be formed on a region of the collection surface other than the pore regions 26 (this region is hereinafter also referred to as a "non-pore region"). In the porous composite 1, the collection layer 3 is present in a large proportion on the pore regions 26 where particulate matter is collected and in the vicinity thereof, and the collection layer 3 is present in a smaller proportion on the non-pore region. This makes it possible to suppress an increase in pressure loss and improve collection efficiency.

In measurement of the coverage ratio of the collection surface and the pore ratio of the non-covered region, for example, the porous composite 1 is subjected to cross-section processing so as to obtain a longitudinal section (a section along the longitudinal direction) of the first cells 231. Then, an SEM image of the inner surfaces of the first cells 231 is captured at 500× magnification in a direction approximately perpendicular to the inner surfaces. Thereafter, the coverage ratio of the collection surface and the pore ratio of the non-covered region are obtained through image analysis of the SEM image using the aforementioned image analysis software ("Image-Pro version 9.3.2" manufactured by Nippon Roper K. K). Preferably, a plurality of values, each indicating the coverage ratio of the collection surface, may be obtained from the longitudinal section of the first cells 231, and an average value of these values may be handled as the coverage ratio of the collection surface in the porous composite 1. The same applies to, for example, the pore ratio of the non-covered region and the porosity of the collection layer 3.

The collection layer 3 includes particles deposited in the pores of the collection surface. Typically, the particles deposited in the pores are bonded to (or adhere to) one another and form a porous layer. Some of the particles are also bonded to the base material 2. Preferably, the particles of the collection layer 3 may be bonded directly to one another without the intervention of any other material (binding material). In this case, the collection layer 3 does not include a binding material and is thus substantially configured by only the particles. Depending on a technique for forming the collection layer 3, particles may be bonded to one another via a binding material. When a cluster of particles bonded to one another is referred to as a bonded particle cluster, the bonded particle cluster as a whole is not always present inside the pore(s), and some particles in the bonded particle cluster may be present outside the pore or on the non-pore region. Alternatively, the collection layer 3 may include a bonded particle cluster and particles that are present in isolation on the non-pore region.

The porosity of the collection layer 3 (the porosity of the bonded particle cluster) in the pores of the collection surface may, for example, be higher than or equal to 60%, preferably hither than or equal to 70%, and more preferably higher than or equal to 75%. The collection layer 3 with an excessively low porosity increases pressure loss. The porosity of the collection layer 3 may also be preferably lower than or equal to 90% and more preferably lower than or equal to 85%. The collection layer 3 with an excessively high porosity lowers the efficiency of collection of particulate matter.

In measurement of the porosity of the collection layer 3, for example, the porous composite 1 that has undergone the aforementioned cross-section processing may be used and an SEM image of a region that includes a section of the collection layer 3 may be captured at 2000× magnification. Thereafter, the porosity of the collection layer 3 is obtained through image analysis of the SEM image using the aforementioned image analysis software ("Image-Pro version 9.3.2" manufactured by Nippon Roper K. K). This image analysis may be conducted by using, for example, a technique similar to that disclosed in International Publication No. 2020/194681 (Document 2 described above). Specifically, the areas of bright regions in each of which bright portions (i.e., particles of the collection layer 3) are connected to one another and the areas of dark regions in each of which dark portions (i.e., pores of the collection layer 3) are connected to one another are calculated in a region of the SEM image that includes the collection layer 3. Then, the total area of the dark regions is divided by the sum of the total area of the bright regions and the total area of the dark regions so as to calculate the porosity of the collection layer 3.

The thickness of the collection layer 3 may, for example, be greater than 2 μm and preferably greater than or equal to 3 μm. The collection layer 3 with an excessively small thickness lowers the efficiency of collection of particulate matter. The thickness of the collection layer 3 may also be, for example, less than 20 μm and preferably less than or equal to 18 μm. The collection layer 3 with an excessively large thickness increases pressure loss. In this case, the volume of the collection layer 3 also increases and accordingly the manufacturing cost of the porous composite 1 becomes high.

The thickness of the collection layer 3 may be measured by, for example, a technique similar to that disclosed in International Publication No. 2020/194681 (Document 2 described above) using a 3D shape measuring machine. Specifically, the porous composite 1 is subjected to cross-section processing so as to obtain a longitudinal section of a plurality of first cells 231 and a plurality of second sells 232. Then, an average position of the surfaces of the collection layer 3 in the first cells 231 and an average position of the surfaces of the pore regions 26 (the surfaces of the pores) in the second cells 232 in a direction perpendicular to the longitudinal section are measured by the 3D shape measuring machine. Then, a difference between the average position of the surfaces of the collection layer 3 and the average position of the surfaces of the pore regions 26 is calculated as the thickness of the collection layer 3.

A median diameter (d50) of a cumulative particle size distribution (volume criterion) of the particles of the collection layer 3 may, for example, be less than or equal to 7.0 μm and preferably less than or equal to 6.5 μm. The median diameter may also be, for example, greater than or equal to 2.0 μm and preferably greater than or equal to 2.5 μm. If the median diameter falls within the above-described range, it is easy to set the porosity of the collection layer 3 to fall within a desired range. The d10 diameter of the cumulative particle size distribution may be preferably greater than or equal to 0.3 μm and more preferably greater than or equal to 0.5 μm. The d90 diameter of the cumulative particle size distribution may be preferably less than or equal to 20 μm and more preferably less than or equal to 15 μm. In formation of the collection layer 3 which will be described later, particles are carried into the pores of the collection surface by the flow of the gas, and this particle carrying into the pores of the collection surface becomes easy if both d10 and d90 fall within the above-described ranges. For example, d10 may be less than or equal to 3.5 μm and preferably less than or equal to 3.0 μm. For example, d90 may be more than or equal to 5.0 μm and preferably more than or equal to 6.5 μm.

In measurement of the cumulative particle size distribution of particles, particles configuring the collection layer 3 are taken out of the porous composite 1 by discomposing the porous composite 1 and scraping off only the collection layer 3 by a spatula or any other tool to avoid containing fragments of the base material 2. To extract particles of the collection layer 3, preferably the porous composite 1 may be subjected to cross-section processing so as to obtain a longitudinal section of second cells 232 (a longitudinal section along the longitudinal direction). Then, a portion of the partition wall 22 (cell wall) that partitions a second cell 232 and a first cell 231 that is adjacent on the rear side of the second cell 232 (the inner side of the section) is removed by tweezers as to expose a longitudinal section of the first cell 231. Then, the collection layer 3 in the first cell 231 is scraped off by a spatula. This prevents fragments of the base material 2 produced during cross-section processing from being mixed into the extracted parties. Thereafter, the cumulative particle size distribution of the particles is measured by a laser diffraction method.

Preferably, the particles of the collection layer 3 may have cavities therein. This relatively lowers the bulk density of the particles (i.e., increase the bulk of the particles) and makes it easy to carry the particles into the pores of the collection layer by the flow of the gas at the time of forming the collection layer 3. The presence or absence of cavities in the particles of the collection layer 3 can be checked using, for example, an SEM image captured at 5000× magnification. The bulk density of the particles may preferably be lower than 0.50 g/ml. There are no particular limitations on the lower limit for the bulk density and, for example, the bulk density may be higher than or equal to 0.10 g/ml. In measurement of the bulk density of the particles of the collection layer 3, the mass of particles of the collection layer 3 extracted from the porous composite 1 is measured. Thereafter, these particles are placed into a graduated measuring cylinder to measure the volume of the particles, and the mass is divided by this volume to obtain the bulk density.

The particles of the collection layer 3 may have a specific surface area of, for example, greater than or equal to 10 $m^2/g$ and preferably greater than or equal to 15 $m^2/g$. There are no particular limitations on the upper limit for the specific surface area and, for example, the specific surface area may be smaller than or equal to 1000 $m^2/g$. The specific surface area of the particles of the collection layer 3 can be measured by the BET specific surface area method using the particles of the collection layer 3 extracted from the porous composite 1.

Preferably, the particles of the collection layer 3 may include catalyst particles that accelerate oxidation of collections. As described previously, the collection layer 3 is selectively or preferentially formed on the pore regions 26 of the collection surface. Thus, most of the aforementioned catalyst particles are disposed in the pores of the collection surface where particulate matter is likely to be deposited. This increases the area of contact between the catalyst particles and the particulate matter and achieves higher catalytic activity. As a result, it is possible to more reliably lower the starting temperature of oxidation of particulate matter (i.e., the combustion of particulate matter at a low temperature).

The catalyst particles described above are typically an oxide and may preferably be $CeO_2$ (ceria), a lanthanum (La)-cerium (Ce) composite oxide, a lanthanum-manganese (Mn)-cerium composite oxide, a lanthanum-cobalt (Co)-cerium composite oxide, a lanthanum-iron (Fe)-cerium composite oxide, or a lanthanum-praseodymium (Pr)-cerium composite oxide. In other words, the particles of the collection layer 3 may preferably include at least one of $CeO_2$, a lanthanum-cerium composite oxide, a lanthanum-manganese-cerium composite oxide, a lanthanum-cobalt-cerium composite oxide, a lanthanum-iron-cerium composite oxide, and a lanthanum-praseodymium-cerium composite oxide.

The lanthanum-cerium composite oxide is an oxide that contains La and Ce and is also expressed as "La—Ce—O." The lanthanum-manganese-cerium composite oxide is an oxide that contains La, Mn, and Ce and is also expressed as "La—Mn—Ce—O." The lanthanum-cobalt-cerium composite oxide is an oxide that contains La, Co, and Ce and is also expressed as "La—Co—Ce—O." The lanthanum-iron-cerium composite oxide is an oxide that contains La, Fe, and Ce and is also expressed as "La—Fe—Ce—O." The lanthanum-praseodymium-cerium composite oxide is an oxide that contains La, Pr, and Ce and is also expressed as "La—Pr—Ce—O."

The particles of the above-described composite oxide can be produced by a technique similar to that disclosed in Japanese Patent Application Laid-Open No. 2021-53537 (Document 4 described above) and, for example, a citric acid method may be used. The particles of the composite oxide may be produced by a different method such as an impregnation supporting method or a polymerized composite method. It is preferable that the collection layer 3 including catalyst particles is substantially composed of only the catalyst particles, but the collection layer 3 may include substances other than the catalyst particles. The collection layer 3 may be formed by catalyst particles (e.g., $Fe_2O_3$ or $MnO_2$) other than those described above, or may be formed by particles other than catalyst particles. Examples of the particles other than catalyst particles include $SiO_2$ particles, SiC particles, and $Al_2O_3$ particles. The collection layer 3 may use particles of a variety of substances such as a metal oxide, a nitride, and a carbide.

Figure 5:
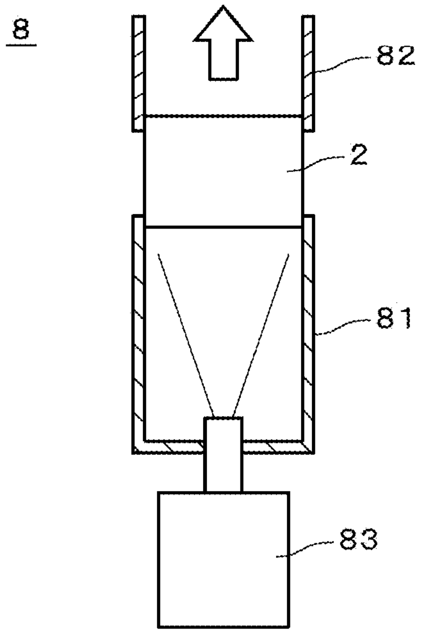
FIG. 5 is a diagram showing a configuration of a dry membrane-forming device.
Figure 6:
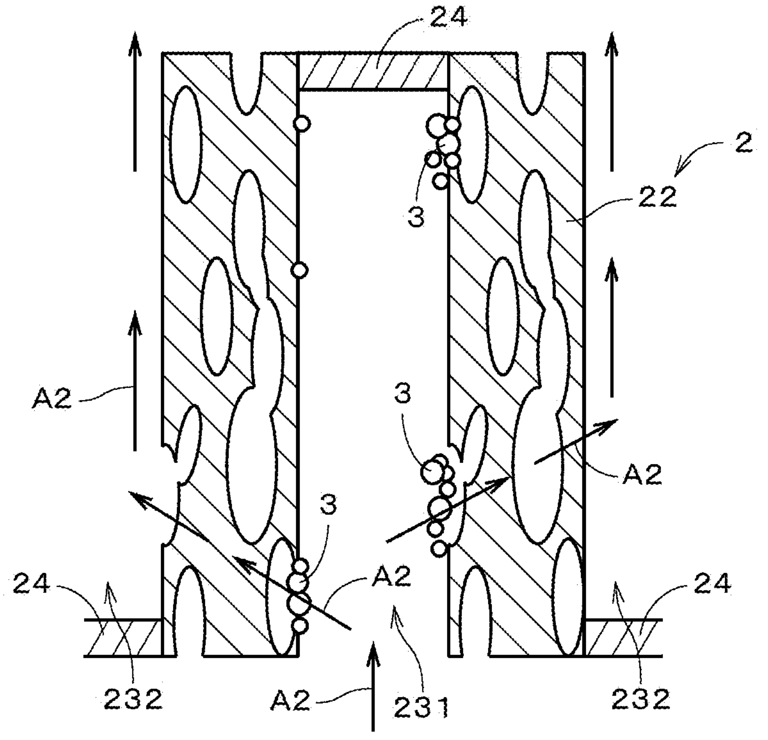
FIG. 6 is a diagram for describing the formation of a collection layer.

Next, one example of the production of the porous composite 1 will be described. Since the method of producing the base material 2 is well-known, the following description is given of the formation of the collection layer 3 on the base material 2 (the base material 2 that does not include the collection layer 3). In the formation of the preferable collection layer 3, particles are deposited on the collection surface of the base material 2 by a dry membrane-forming method. FIG. 5 is a diagram showing a configuration of a dry membrane-forming device 8. FIG. 6 is a diagram for describing the formation of the collection layer 3 and schematically shows part of a section of the base material 2 in the longitudinal direction.

The dry membrane-forming device 8 shown in FIG. 5 includes a first tubular portion 81, a second tubular portion 82, and a particle supplier 83. The first tubular portion 81 and the second tubular portion 82 are both cylindrical members, and their sectional shapes perpendicular to the central axis are approximately the same as the sectional shape of the outer surface of the base material 2 (the outer surface of the tubular outer wall 21). As described previously, the base material 2 is a member that extends in the longitudinal direction and whose one end in the longitudinal direction is inserted in the end of the first tubular portion 81 and whose other end is inserted in the end of the second tubular portion 82. In the present embodiment, the end of the base material 2 at which the first cells 231 (see FIG. 6) are open (i.e., the end at which the second cells 23 are provided with the mesh sealing parts 24) is inserted in the first tubular portion 81, and the end of the base material 2 at which the second cells 232 are open is inserted in the second tubular portion 82. The outer surface of the base material 2 may come in contact with the first tubular portion 81 or the second tubular portion 82 via an O-ring or any other device. Gas and liquid are almost unable to pass through between the outer surface of the base material 2 and the inner surface of the first tubular portion 81 and between the outer surface of the base material 2 and the inner surface of the second tubular portion 83.

The end of the first tubular portion 81 on the side opposite to the base material 2 is connected to the particle supplier 83. The particle supplier 83 supplies into the first tubular portion 81 aerosols in which particles to form the collection layer 3 are dispersed in a gas. A dispersion medium of the aerosols may, for example, be air. The dispersion medium of the aerosols may also be a gas other than air. The end of the second tubular portion 82 on the side opposite to the base material 2 is connected to a pressure-reducing mechanism, which is not shown, to reduce the pressure in the second tubular portion 82. Accordingly, the aerosols supplied into the first tubular portion 81 flow into the base material 2.

As indicated by arrows A2 in FIG. 6, the aerosols flow into the first cells 231. The gas contained in the aerosols enters the interior of the partition wall 22 from pores that are open in the inner surfaces of the first cells 231 (collection surface) and flows to the second cells 232 adjacent to the first cells 231. The gas flowing to the second cells 232 is exhausted out of the base material 2 through the openings of the second cells 232. At this time, most of the particles contained in the aerosols enter the interior of the pores in the collection surface together with the gas and are deposited in the pores. Some of the particles may adhere to non-pore regions of the collection surface (the surface of the base material 2). Preferable particles have cavities therein and/or have a bulk density of lower than 0.50 g/ml. Thus, these particles can easily enter the interior of the pores of the collection surface together with the gas. From the viewpoint of allowing a larger number of particles to enter the interior of the pores in the collection surface, d90 of the cumulative particle size distribution of particles may preferably be less than or equal to the mean pore diameter of the base material 2.

Through the above-described processing, most of the particles deposited on the base material 2 are present in the pores of the collection surface. That is, in a plan view of the collection surface, the collection layer 3 is selectively or preferentially formed on the pore regions 26 (see FIG. 3). Conditions for depositing particles on the collection surface (including the interior of the pores) by using the dry membrane-forming device 8 may be determined approximately depending on factors such as the coverage ratio of the collection surface, the pore ratio of the non-covered region, the porosity of the collection layer 3, and the thickness of the collection layer 3. In one example, particles in the aerosols may have a density of 1 mg/cc to 10 mg/cc, and the rate of aspiration of the aerosols may be in the range of 0.1 m/s to 5 m/s.

The production of the porous composite 1 further involves baking the porous composite 1 taken out of the dry membrane-forming device 8. The heating temperature for the baking may, for example, be higher than or equal to 500° C. and lower than or equal to 1300° C. The heating time for the baking may, for example, be longer than or equal to 0.5 hours and shorter than or equal to two hours. The heating temperature and the heating time for the baking may be determined approximately depending on factors such as the type of the particles of the collection layer 3. The baking may be omitted if sufficient bond strength is ensured between the particles and the base material 2.

Next, Examples 1 to 11 of the porous composite according to the present invention and Comparative Examples 1 to 6 for comparison with the porous composite will be described with reference to Tables 1 to 3.

TABLE 1

| | Base Material | | | | | Method of Producing Collection Layer | | |
|---|---|---|---|---|---|---|---|---|
| | Material | Shape | Open Porosity % | Open Area Ratio of Surface % | Mean Pore Diameter μm | Membrane-Forming Method | Baking Temperature ° C. | Membrane-Forming Weight g |
| Example 1 | Cordierite | Honeycomb Filter | 55 | 30 | 18 | Dry | 800 | 2 |
| Example 2 | Cordierite | Honeycomb Filter | 55 | 30 | 18 | Dry | 800 | 3 |
| Example 3 | Cordierite | Honeycomb Filter | 55 | 30 | 18 | Dry | 600 | 3 |
| Example 4 | Cordierite | Honeycomb Filter | 55 | 30 | 18 | Dry | 800 | 5 |
| Example 5 | Cordierite | Honeycomb Filter | 55 | 30 | 18 | Dry | 800 | 10 |
| Example 6 | Cordierite | Honeycomb Filter | 55 | 30 | 18 | Dry | 800 | 3 |
| Example 7 | Cordierite | Honeycomb Filter | 55 | 30 | 18 | Dry | 800 | 10 |
| Example 8 | Cordierite | Honeycomb Filter | 55 | 30 | 18 | Dry | 800 | 5 |
| Example 9 | Cordierite | Honeycomb Filter | 55 | 30 | 18 | Dry | 800 | 10 |
| Example 10 | Cordierite | Honeycomb Filter | 55 | 30 | 18 | Dry | 1200 | 2 |
| Example 11 | Cordierite | Honeycomb Filter | 55 | 30 | 18 | Dry | 1200 | 4 |
| Comparative Example 1 | Cordierite | Honeycomb Filter | 55 | 30 | 18 | Dry | 800 | 1 |
| Comparative Example 2 | Cordierite | Honeycomb Filter | 55 | 30 | 18 | Dry | 800 | 14 |
| Comparative Example 3 | Cordierite | Honeycomb Filter | 55 | 30 | 18 | Dry | 1200 | 10 |
| Comparative Example 4 | Cordierite | Honeycomb Filter | 55 | 30 | 18 | Wet | 800 | 12 |
| Comparative Example 5 | Cordierite | Honeycomb Filter | 55 | 30 | 18 | Wet | 800 | 24 |
| Comparative Example 6 | Cordierite | Honeycomb Filter | 55 | 30 | 18 | Dry | 1200 | 12 |
| Reference Example | Cordierite | Honeycomb Filter | 55 | 30 | 18 | — | — | — |

TABLE 2

| | Covered Region | | | | Particles of Collection Layer | | | | | |
|---|---|---|---|---|---|---|---|---|---|---|
| | Coverage Ratio of Collection Surface % | Pore Ratio of Non-Covered Region % | Membrane Thickness μm | Porosity % | Material | Particle Diameter (d50) μm | Particle Diameter (d10) μm | Particle Diameter (d90) μm | Specific Surface Area $m^2/g$ | Bulk Density |
| Example 1 | 25 | 9 | 3 | 79 | La—Mn—Ce—O | 4.5 | 1.1 | 10 | 30 | Low |
| Example 2 | 30 | 6 | 4 | 78 | La—Mn—Ce—O | 4.5 | 1.1 | 10 | 30 | Low |
| Example 3 | 34 | 1 | 5 | 81 | La—Mn—Ce—O | 4.5 | 1.1 | 10 | 70 | Low |
| Example 4 | 48 | 2 | 7 | 79 | La—Mn—Ce—O | 4.5 | 1.1 | 10 | 30 | Low |
| Example 5 | 60 | 0 | 13 | 80 | La—Mn—Ce—C | 4.5 | 1.1 | 10 | 30 | Low |
| Example 6 | 33 | 9 | 4 | 76 | La—Mn—Ce—O | 2.8 | 0.5 | 7.6 | 35 | Low |
| Example 7 | 55 | 1 | 15 | 82 | La—Mn—Ce—O | 6.3 | 2.8 | 12 | 25 | Low |
| Example 8 | 43 | 3 | 6 | 78 | $CeO_2$ | 3.7 | 1.0 | 9.2 | 20 | Low |
| Example 9 | 59 | 0 | 12 | 78 | $CeO_2$ | 3.7 | 1.0 | 9.2 | 20 | Low |
| Example 10 | 34 | 4 | 4 | 81 | $SiO_2$ | 4.0 | 2.6 | 7.0 | 720 | Low |
| Example 11 | 56 | 0 | 8 | 80 | $SiO_2$ | 4.0 | 2.6 | 7.0 | 720 | Low |
| Comparative Example 1 | 16 | 19 | 2 | 80 | La—Mn—Ce—O | 4.5 | 1.1 | 10 | 30 | Low |
| Comparative Example 2 | 95 | 0 | 20 | 79 | La—Mn—Ce—O | 4.5 | 1.1 | 10 | 30 | Low |
| Comparative Example 3 | 60 | 29 | 6 | 60 | La—Mn—Ce—O | 5.0 | 3.0 | 11 | 1 | High |
| Comparative Example 4 | 62 | 33 | 13 | 55 | La—Mn—Ce—O | 4.5 | 1.1 | 10 | 30 | Low |
| Comparative Example 5 | 98 | 0 | 21 | 52 | La—Mn—Ce—O | 4.5 | 1.1 | 10 | 30 | Low |
| Comparative Example 6 | 82 | 3 | 11 | 75 | SiC | 2.7 | 1.2 | 5.5 | 2 | High |
| Reference Example | 0 | 0 | — | — | — | — | — | — | — | — |

TABLE 3

| | Evaluation | | | |
|---|---|---|---|---|
| | Initial Pressure Loss Judgment | Collection Efficiency Judgment | Starting Temperature of Oxidation of Soot Judgment | Overall Evaluation Judgment |
| Example 1 | ◎ | ○ | ○ | B |
| Example 2 | ◎ | ◎ | ◎ | A |
| Example 3 | ◎ | ◎ | ◎ | A |
| Example 4 | ○ | ◎ | ◎ | B |
| Example 5 | ○ | ◎ | ◎ | B |
| Example 6 | ○ | ◎ | ◎ | B |
| Example 7 | ◎ | ◎ | ◎ | A |
| Example 8 | ◎ | ◎ | ○ | B |
| Example 9 | ○ | ◎ | ◎ | B |
| Example 10 | ◎ | ◎ | Δ | C |
| Example 11 | ○ | ◎ | Δ | C |
| Comparative Example 1 | ◎ | X | Δ | F |
| Comparative Example 2 | X | ◎ | ◎ | F |
| Comparative Example 3 | X | Δ | Δ | F |
| Comparative Example 4 | ○ | X | ◎ | F |
| Comparative Example 5 | X | ○ | ◎ | F |
| Comparative Example 6 | ◎ | Δ | Δ | F |
| Reference Example | ◎ | X | Δ | F |

Examples 1 to 11 used base materials formed of cordierite and having a honeycomb filter shape (honeycomb structure). The base material had an open porosity of 55%, an open area ratio of the surface of 30%, and a mean pore diameter of 18 μm. The open porosity was measured by the Archimedes method using deionized water as a medium. The open area ratio of the surface was obtained through image analysis of an SEM image of the surface of the base material (obtained at 500× magnification) using the aforementioned image analysis software. The mean pore diameter was measured by a mercury porosimeter.

In Examples 1 to 11, the collection layer was formed by a dry membrane-forming method using the dry membrane-forming device 8 shown in FIG. 5. The density of particles in aerosols was 5 mg/cc, and the rate of aspiration of the aerosols was 1 m/s. In Examples 1 to 7, La—Mn—Ce—O particles were used. Among Examples 1 to 7, Examples 1, 2, 4, and 5 used different membrane-forming weights of the collection layer by, for example, adjusting the membrane-forming time. In Example 3, baking was conducted at a lower heating temperature (baking temperature). In Example 6, particles with smaller particle diameters were used, and in Example 7, particles with larger particle diameters were used. Examples 8 and 9 used $CeO_2$ particles and different membrane-forming weights of the collection layer. Examples 10 and 11 used $SiO_2$ particles and different membrane-forming weights of the collection layer. Also, a higher baking temperature was used.

In Examples 1 to 11, the proportions of the area of the covered region out of the collection surface (the coverage ratio of the collection surface) were in the range of 25% to 60% and all were less than or equal to 70%. The proportions of the area of the pore region out of the non-covered region (the pore ratios of the non-covered region) were in the range of 0% to 9% and all were less than or equal to 15%. The coverage ratios of the collection surface and the pore ratios of the non-covered region were obtained through image analysis of an SEM image of the collection surface (obtained at 500× magnification) using the aforementioned image analysis software. Each of the coverage ratios of the collection surface and the pore ratios of the non-covered region in Table 2 was an average value of values obtained from five SEM images showing different regions of the collection surface.

In Examples 1 to 11, the collection layers had a thickness (membrane thickness) of 3 μm to 15 μm. As described above, the thickness of the collection layer was obtained as a difference between the average position of the surface of the collection layer and the average position of the surface of the pore region, measured by the 3D shape measuring machine. In Examples 1 to 11, the porosities of the collection layer in the pores of the collection surface were in the range of 76% to 82% and all were higher than or equal to 70% and lower than or equal to 90%. These porosities were obtained through image analysis of an SEM image of a section of the collection layer 3 (obtained at 2000× magnification) using the aforementioned image analysis software.

In Examples 1 to 11, median diameters (d50) of the cumulative particle size distribution (volume criterion) of particles were in the range of 2.8 μm to 6.3 μm. Also, d10 diameters were in the range of 0.5 to 2.8 μm and all were greater than or equal to 0.3 μm, and d90 diameters were in the range of 7.0 to 12 μm and all were less than or equal to 20 μm. The cumulative particle size distribution was acquired by extracting only particles of the collection layer from the porous composite and measuring these particles by a laser diffraction method.

In Examples 1 to 9 using La—Mn—Ce—O particles or $CeO_2$ particles, the specific surface areas of the particles were in the range of 20 $m^2/g$ to 70 $m^2/g$, and in Examples 10 and 11 using $SiO_2$ particles, the specific surface areas of the particles were 720 $m^2/g$. The specific surface areas of the particles were acquired by measuring particles extracted from the porous composite by the BET specific surface area method. In Examples 1 to 11, the bulk densities were all less than 0.50 g/ml. In Table 2, cases where the bulk density was lower than 0.50 g/ml are expressed as "Low," and cases where the bulk density was higher than or equal to 0.50 g/ml are expressed as "High." The bulk density of the particles was acquired by measuring the mass of the particles extracted from the porous composite, placing the particles in a graduated measuring cylinder to measure the volume of the particles, and then dividing the mass by the volume. Although not shown in the table, the La—Mn—Ce—O particles had cavities therein as a result of examination using the SEM images obtained at 5000× magnification. The same applied to $CeO_2$ particles and $SiO_2$ particles.

Comparative Examples 1 to 6 used similar base materials to those in Examples 1 to 11. In Comparative Examples 1 to 5, La—Mn—Ce—O particles were used, and in Comparative Example 6, SiC particles were used. In Comparative Examples 1, 2, 3, and 6, the collection layer was formed by a dry membrane-forming method as in Examples 1 to 11. At this time, in Comparative Example 1, the membrane-forming weight of the collection layer was excessively low, and in Comparative Example 2, the membrane-forming weight of the collection layer was excessively high. As a result, in Comparative Example 1, the coverage ratio of the collection surface became considerably low, and the pore ratio of the non-covered region became higher than 15%. In Comparative Example 2, the coverage ratio of the collection surface became considerably higher than 70%.

In Comparative Examples 3 and 6, high baking temperatures were used. As a result, in Comparative Example 3 using La—Mn—Ce—O particles, the pore ratio of the non-covered region became considerably higher than 15%. In Comparative Example 6 using SiC particles, the coverage ratio of the collection surface became considerably higher than 70%. In Comparative Examples 3 and 6, the bulk densities of the particles were both higher than or equal to 0.50 g/ml.

In Comparative Examples 4 and 5, the collection layer was formed by a wet membrane-forming method. Specifically, La—Mn—Ce—O particles were mixed with a liquid such as water to generate slurry, and this slurry was supplied into the first cells. The liquid such as water passed through the partition wall and flowed from the second cells to the outside of the base material, and the La—Mn—Ce—O particles adhered to the inner surfaces of the first cells without passing through the partition wall. Thereafter, baking was conducted. Comparative Examples 4 and 5 used different membrane-forming weights of the collection layer. In Comparative Example 4 using a relatively small membrane-forming weight, the pore ratio of the non-covered region became considerably higher than 15%. In Comparative Example 5 using a relatively large membrane-forming weight, the coverage ratio of the collection surface became considerably higher than 70%. In Comparative Examples 4 and 5, the collection layer had a porosity of lower than 70%.

In performance evaluation of the porous composites according to Examples 1 to 11 and Comparative Examples 1 to 6, overall performance was evaluated by comparison of the initial pressure loss (i.e., pressure loss before collection of particulate matter or the like), the collection efficiency, and the starting temperature of oxidation of soot. Similar performance evaluation was also conducted by using a base material that did not include the collection layer as a reference example.

In evaluation of the initial pressure loss in the porous composite, first, air with an ambient temperature was supplied to the porous composite at a flow rate of 10 $Nm^3/min$ to measure a pressure difference in the porous composite before and after the supply (i.e., a pressure difference in air between on the inflow side and on the outflow side). Then, a pressure difference in the case of using only the base material was used as a reference pressure difference, and the rate of increase of the above-described pressure difference in the porous composite with respect to the reference pressure difference was assumed to be the rate of increase of the initial pressure loss. The rate of increase (%) of the initial pressure loss was obtained from $(A-B)/B\times100$, where A was the above-described pressure difference in the porous composite and B was the reference pressure difference in the base material. In the evaluation of the initial pressure loss, cases where the rate of increase of the initial pressure loss was lower than or equal to 20% were evaluated as "excellent (double circle)," cases where the rate of increase of the pressure loss was higher than 20% and lower than or equal to 40% were evaluated as "good (single circle)," and cases where the rate of increase of the pressure loss was higher than 40% were evaluated as "poor (cross)."

The collection efficiency of the porous composite was obtained as follows. First, the porous composite was mounted as a GPF in an exhaust system of a passenger vehicle including a direct-injection gasoline engine with a displacement of 2 liters, and a vehicle test was conducted using a chassis dynamometer. In the vehicle test, the number of exhausted pieces of particulate matter in an exhaust gas during driving in a driving mode regulated in Europe (RTS95) was measured by a measurement method in conformity with a particulate measuring protocol (PMP) regulated in Europe. A similar vehicle test was also conducted without mounting any GPF in the above exhaust system, and the number of exhausted pieces of particulate matter in an exhaust gas was measured by a similar measurement method. The number of exhausted pieces of particulate matter in the case of mounting no GPF was used as a "reference number of exhausted pieces," and the value (%) obtained by dividing a difference between the reference number of exhausted pieces and the number of exhausted pieces of particulate matter measured in the case of mounting the porous composite by the reference number of exhausted pieces was obtained as "collection efficiency (%)." In evaluation of the collection efficiency, cases where the collection efficiency was higher than or equal to 98% were evaluated as "excellent (double circle)," and cases where the collection efficiency was lower than 98% and higher than or equal to 95% were evaluated as "good (single circle)." Also, cases where the collection efficiency was lower than 95% and higher than or equal to 90% were evaluated as "marginal (triangle)," and cases where the collection efficiency was lower than 90% were evaluated as "poor (cross)."

In Examples 1 to 11 in which the coverage ratio of the collection surface was less than or equal to 70% and the pore ratio of the non-covered region was lower than or equal to 15%, the initial pressure loss and the collection efficiency were both evaluated as either "excellent (double circle)" or "good (single circle)." In contrast, in Comparative Examples 1 to 6 in which the coverage ratio of the collection surface was higher than 70% or the pore ratio of the non-covered region was higher than 15%, either the initial pressure loss was evaluated as "poor (cross)" or the collection efficiency was evaluated as "poor (cross)" or "marginal (triangle)." In the reference example, the initial pressure loss was evaluated as excellent (double circle)" and the collection efficiency was evaluated as "poor (cross)."

The starting temperature of oxidation of soot in the porous composite was obtained as follows. First, a test specimen with a diameter of 118.4 mm and a length of 127 mm was cut out of the porous composite, and soot was deposited on the test specimen at a rate of 0.5 g/L by a soot generator to obtain a measurement sample. Then, the temperature was raised while passing a balanced gas (mixed gas) that contained 80% of nitrogen ($N_2$) and 20% of oxygen ($O_2$) to the above measurement sample at a rate of SV40000 (1/hr). Then, a CO gas and a $CO_2$ gas generated by heating from the measurement sample were detected by a non-dispersive infrared absorption method (ND-IR). The temperature at which the cumulative amount of the generated $CO_2$ gas reached 10% of the total amount of the $O_2$ gas was obtained as the starting temperature of oxidation of soot. A lower starting temperature of oxidation resulted in higher catalytic activity of the particles of the collection layer.

In evaluation of the starting temperature of oxidation of soot, cases where the starting temperature of oxidation was lower than or equal to 410° C. were evaluated as "excellent (double circle)," and cases where the starting temperature of oxidation was higher than 410° C. and lower than or equal to 460° C. were evaluated as "good (single circle)." Also, cases where the starting temperature of oxidation was higher than 460° C. were evaluated as "marginal (triangle)."

In Examples 1 to 9 using La—Mn—Ce—O particles or $CeO_2$ particles, the starting temperature of oxidation of soot was evaluated as either "excellent (double circle)" or "good (single circle)." In Examples 10 and 11 using $SiO_2$ particles, the starting temperature of oxidation of soot was evaluated as "marginal (triangle)." Among Comparative Examples 1 to 5 using La—Mn—Ce—O particles, in Comparative Examples 2, 4, and 5, except Comparative Example 1 using an excessively low membrane-forming weight of the collection layer and Comparative Example 3 using an excessively high baking temperature, the starting temperature of oxidation of soot was evaluated as "excellent (double circle) ." On the other hand, in Comparative Examples 1 and 3, in Comparative Example 6 using SiC particles, and in the reference example including no collection layer, the starting temperature of oxidation of soot was evaluated as "marginal (triangle)."

In overall evaluation of Examples 1 to 11, Comparative Examples 1 to 6, and the reference example, evaluation level "A" was given to cases where the initial pressure loss, the collection efficiency, and the starting temperature of oxidation of soot were all evaluated as "excellent (double circle)." Evaluation level "B" was given to cases that included one or more "good (single circle)" evaluations and no "marginal (triangle)" nor "poor (cross)" evaluation. Evaluation level "C" was given to cases that included only one "marginal (triangle)" evaluation and no "poor (cross)" evaluation. Evaluation level "F" was given to cases that included at least one "poor (cross)" evaluation or two or more "marginal (triangle)" evaluations. In the overall evaluation, "A" is the highest level, and the evaluation levels decrease in the order of "B">"C">"F."

In the overall evaluation, Examples 2, 3, and 7 were evaluated as "A," Examples 1, 4 to 6, 8, and 9 were evaluated as "B," and Examples 10 and 11 were evaluated as "C." Comparative Examples 1 to 6 and the reference example were all evaluated as "F."

As described above, the porous composite 1 includes the porous base material 2 and the porous collection layer 3 provided on the collection surface (e.g., the inner surfaces of the first cells 231) of the base material 2. The collection layer 3 includes particles deposited in the pores of the collection surface. In a plan view of the collection surface, the proportion of the area of the covered region covered with the collection layer 3 out of the collection surface (the coverage ratio of the collection surface) is less than or equal to 70%, and the proportion of the area of the pore regions 26 out of the non-covered region that is not covered with the collection layer 3 (the pore ratio of the non-covered region) is less than or equal to 15%. Accordingly, it is possible to achieve low pressure loss and high collection efficiency as in Examples 1 to 11.

In a plan view of the collection surface of the preferable porous composite 1, the proportion of the area of the covered region out of the collection surface is more than or equal to 25%. Accordingly, it is possible to more reliably improve collection efficiency.

In the preferable porous composite 1, the particles of the collection layer 3 have cavities therein and/or have a bulk density of lower than 0.50 g/ml. This makes it easy to carry the particles into open pores of the collection surface along the flow of the gas during formation of the collection layer 3 and accordingly facilitates the production of the porous composite 1.

In the preferable porous composite 1, d10 of the cumulative particle size distribution of the particles of the collection layer 3 is greater than or equal to 0.3 μm, and d90 thereof is less than or equal to 20 μm. If the particles of the collection layer 3 have a narrow particle size distribution in this way, most of the particles have particle diameters of less than or equal to the mean pore diameter of the base material 2 and makes it easier to deposit the particles in the pores of the collection surface.

In the preferable porous composite 1, the particles of the collection layer 3 include catalyst particles that accelerate oxidation of collections. This accelerates oxidation of collected particulate matter and lowers the starting temperature of oxidation of the particulate matter. Besides, since most of the catalyst particles are deposited in the pores, it is possible to increase the area of contact between the catalyst particles and the particulate matter and to achieve higher catalytic activity (i.e., a lower starting temperature of oxidation).

Preferable catalyst particles are $CeO_2$, a lanthanum-cerium composite oxide, a lanthanum-manganese-cerium composite oxide, a lanthanum-cobalt-cerium composite oxide, a lanthanum-iron-cerium composite oxide, or a lanthanum-praseodymium-cerium composite oxide. This more reliably lowers the starting temperature of oxidation of particulate matter.

In the preferable porous composite 1, the collection layer 3 has a porosity of higher than or equal to 70% and lower than or equal to 90%. The porosity of higher than or equal to 70% makes it easy to achieve a decrease in pressure loss in the porous composite 1. The porosity of lower than or equal to 90% makes it easy to achieve high correction efficiency.

In the preferable porous composite 1, the base material 2 has a honeycomb structure whose interior is partitioned into the cells 23 by the partition wall 22, and at least some of the cells 23 (e.g., the first cells 231) have inner surfaces that serve as the collection surface described above. Accordingly, it is possible to provide a honeycomb filter that achieves low pressure loss and high collection efficiency.

As described above, the porous composite 1 is capable of achieving low pressure loss and high collection efficiency. Accordingly, the porous composite 1 is in particular suitable for use as a GPF that collects particulate matter in an exhaust gas exhausted from a gasoline engine.

The porous composite 1 described above may be modified in various ways.

The coverage ratio of the collection surface may be less than 25% as long as high collection efficiency is achieved.

The bulk density of the particles of the collection layer 3 may be higher than or equal to 0.50 g/ml as long as the collection layer 3 is selectively or preferentially formed on the pore regions 26 of the collection surface. Similarly, d10 of the cumulative particle size distribution of the particles may be less than 0.3 μm, and d90 thereof may be greater than 20 μm.

The porosity of the collection layer 3 may be lower than 70% or may be higher than 90%.

The porous composite 1 is not limited to being used as the GPF described above, and may be used as a diesel particulate filter (DPF) that collects particulate matter in an exhaust gas exhausted from a diesel engine. As described above, since the porous composite 1 is capable of achieving low pressure loss and high collection efficiency, the porous composite 1 is in particular suitable for use not only as a GPF but also as a DPF. Note that the porous composite 1 may be used as any of various filters other than a GPF and a DPF. As another alternative, the porous composite 1 may be used in applications other than filters.

The structure of the porous composite 1 may be modified in various ways. For example, the mesh sealing parts 24 may be omitted from the base material 2. The collection layer 3 may be provided such that the inner surfaces of all of the cells 23 serve as the collection surface. Moreover, the base material 2 does not necessarily have to have a honeycomb structure, and the interior of the base material 2 may be of any other shape that is not partitioned by the partition wall, such as a tubular shape or a flat plate-like shape.

The configurations of the above-described preferred embodiment and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The present invention is applicable as a filter that collects particulate matter, such as a gasoline particulate filter that collects particulate matter in an exhaust gas exhausted from a gasoline engine. The present invention is also applicable as any other filter or usable in applications other than filters.

REFERENCE SIGNS LIST

1 porous composite
2 base material
3 collection layer
22 partition wall
26 pore region
231 first cell
232 second cell

The invention claimed is:

1. A porous composite comprising:
a porous base material; and
a porous collection layer provided on a collection surface of said base material,
wherein said collection layer includes particles deposited in pores of said collection surface, and
in a plan view of said collection surface, a proportion of an area of a covered region of the base material that is covered with said collection layer out of said collection surface is less than or equal to 70% and greater than or equal to 20%, and a proportion of an area of a pore region out of a non-covered region of the base material that is not covered with said collection layer is less than or equal to 15% and greater than or equal to 0%; and
wherein said particles have cavities therein.

2. The porous composite according to claim 1, wherein in a plan view of said collection surface, the proportion of the area of said covered region out of said collection surface is more than or equal to 25%.

3. The porous composite according to claim 1, wherein said particles have a bulk density of less than 0.50 g/ml.

4. The porous composite according to claim 1, wherein d10 of a cumulative particle size distribution of said particles is greater than or equal to 0.3 μm, and d90 thereof is less than or equal to 20 μm.

5. The porous composite according to claim 1, wherein said collection layer has a porosity of higher than or equal to 70% and lower than or equal to 90%.

6. The porous composite according to claim 1, wherein said particles include catalyst particles operable for oxidizing deposited particulate matter.

7. The porous composite according to claim 6, wherein said catalyst particles are $CeO_2$, a lanthanum-cerium composite oxide, a lanthanum-manganese-cerium composite oxide, a lanthanum-cobalt-cerium composite oxide, a lanthanum-iron-cerium composite oxide, or a lanthanum-praseodymium-cerium composite oxide.

8. The porous composite according to claim 1, wherein said base material has a honeycomb structure whose interior is partitioned into a plurality of cells by a partition wall, and
at least some of said plurality of cells have an inner surface that serves as said collection surface.

9. A gasoline particulate filter operable for collecting particulate matter in an exhaust gas exhausted from a gasoline engine comprising the porous composite according to claim 8.

* * * * *